(12) United States Patent
Waller

(10) Patent No.: US 12,171,371 B2
(45) Date of Patent: Dec. 24, 2024

(54) TORTILLA FRYER

(71) Applicants: Russell G. Waller, El Dorado, KS (US); Keri S. Waller, El Dorado, KS (US)

(72) Inventor: Russell G. Waller, El Dorado, KS (US)

(*) Notice: Subject to any disclaimer, the term of this patent is extended or adjusted under 35 U.S.C. 154(b) by 515 days.

(21) Appl. No.: 17/535,392

(22) Filed: Nov. 24, 2021

(65) Prior Publication Data

US 2022/0079385 A1    Mar. 17, 2022

(51) Int. Cl.
*A47J 37/12*    (2006.01)
*A21D 13/42*    (2017.01)

(52) U.S. Cl.
CPC ........... *A47J 37/1295* (2013.01); *A21D 13/42* (2017.01)

(58) Field of Classification Search
CPC .... A47J 37/1295; A47J 37/0611; A21D 13/42
See application file for complete search history.

(56) References Cited

U.S. PATENT DOCUMENTS

| | | | | |
|---|---|---|---|---|
| 880,498 | A * | 3/1908 | Bates | A47J 37/0611 99/383 |
| 965,475 | A * | 7/1910 | Marcuccilli | A47J 37/0611 99/383 |
| 1,019,237 | A * | 3/1912 | Flagstad et al. | A47J 37/0611 99/383 |
| 1,091,729 | A * | 3/1914 | Bruckman | A47J 37/0611 425/441 |
| 1,119,548 | A * | 12/1914 | Stupian | A47J 37/0611 99/383 |
| 1,151,298 | A * | 8/1915 | Sharp | A47J 37/0611 99/383 |
| 1,293,819 | A | 2/1919 | Lewison | |
| 1,314,602 | A * | 9/1919 | Miglietta | A47J 37/0611 292/228 |
| 1,611,852 | A * | 12/1926 | Cooper | B65D 35/42 220/288 |
| 2,814,981 | A | 12/1957 | Wendel | |

(Continued)

FOREIGN PATENT DOCUMENTS

FR    2954044 A1    4/2013
GB    4026    10/1901

(Continued)

OTHER PUBLICATIONS

Norpro Wire Tortilla Fry Basket https://wholesale.norpro.com/wire-tortilla-fry-basket.html.

(Continued)

*Primary Examiner* — John J Norton
(74) *Attorney, Agent, or Firm* — Kenneth H. Jack; Davis & Jack, LLC

(57) ABSTRACT

A tortilla fryer incorporating a plurality of cone pairs, each cone pair among the plurality of cone pairs including an inner cone which is horizontally received within an outer cone; the tortilla fryer further incorporating a support frame, wherein each cone pair is fixedly attached to and supported within the support frame; the tortilla fryer further incorporating cone binding chain and spring arm assemblies which operatively interconnect the support frame and the cone pairs' inner cones, the chain and spring arm assemblies resisting horizontal movements of the inner cones out of the outer cones.

13 Claims, 2 Drawing Sheets

(56) References Cited

U.S. PATENT DOCUMENTS

| | | | |
|---|---|---|---|
| 3,424,076 A | | 1/1969 | Bernatz et al. |
| 3,590,728 A | * | 7/1971 | Stanley .................. A47J 43/20 |
| | | | 99/439 |
| 3,604,342 A | | 11/1971 | Harding |
| 4,173,926 A | | 11/1979 | Brignall |
| 4,313,964 A | * | 2/1982 | Dembecki ................ A21B 3/13 |
| | | | 426/549 |
| 4,371,327 A | | 2/1983 | Fievez |
| 4,494,453 A | | 1/1985 | Bentson |
| D277,922 S | | 3/1985 | Bentson |
| D281,942 S | | 12/1985 | Bentsor |
| 4,656,929 A | | 4/1987 | Dinh |
| D299,300 S | | 1/1989 | Lie |
| 4,817,513 A | * | 4/1989 | Carbon .................. A21B 5/026 |
| | | | 99/383 |
| 4,915,964 A | | 4/1990 | Smietana |
| 5,009,902 A | | 4/1991 | Mercenari |
| 5,072,664 A | | 12/1991 | Tienor et al. |
| 5,223,286 A | * | 6/1993 | Selbak .................. A21B 5/026 |
| | | | 426/138 |
| 5,756,976 A | | 5/1998 | Akasaka |
| 7,008,655 B1 | | 3/2006 | Aslanis |
| 11,076,629 B2 | | 8/2021 | Kunes et al. |
| 2008/0220132 A1 | | 9/2008 | Taminich |
| 2017/0258098 A1 | | 9/2017 | Vogler |
| 2021/0045568 A1 | * | 2/2021 | Sabeh .................. A47J 37/0611 |
| 2022/0079385 A1 | | 3/2022 | Waller |

FOREIGN PATENT DOCUMENTS

| | | |
|---|---|---|
| WO | WO 02067695 A1 | 9/2002 |
| WO | WO 2006185989 A1 | 12/2006 |

OTHER PUBLICATIONS

Tablecraft Double Cup Tortilla Fry Basket, For 8" Tortillas https://www.tablecraft.com/Double-Cup-Tortilla-Fry-Basket-For-8-Tortillas.

Ta-Cones (Taco Cones) By MaddieJ3 https://www.instructables.com/Taco-Cones/.

* cited by examiner

TORTILLA FRYER

FIELD OF THE INVENTION

This invention relates to apparatus and assemblies which are configured and adapted for holding and suspending food items within a vat fryer for heated oil cooking or frying. More particularly, this invention relates to such assemblies and apparatus which are adapted for specially configuring, shaping, and holding tortillas during such deep oil cooking.

BACKGROUND OF THE INVENTION

Tortillas are known to be cooked in a cone shape within vat type heated oil fryers. The uncooked tortillas are held in their cone shapes between nesting metal cones which simultaneously conically mold the interior and exterior surfaces of the tortillas.

Such known conical tortilla cooking assemblies and apparatus are commonly deficient in their ability to cook multiple conical tortillas at the same time, and such assemblies often lack the ability to securely hold and support the tortillas in their cone shapes during cooking. Such known conical tortilla assemblies also undesirably occupy excess space within a deep oil fryer, and they often undesirably cause sticking or adhesion of cooked tortillas to conical mold elements.

The instant inventive tortilla fryer solves or ameliorates the problems, defects, and deficiencies noted above by providing a specially configured framework for holding horizontal series of nesting tortilla holding cones, and by providing in combination with such framework, means for flexibly biasing or urging the cones toward their nested tortilla holding and shaping configurations during deep oil cooking.

BRIEF SUMMARY OF THE INVENTION

The instant inventive tortilla fryer is intended for use in deep oil fry cooking of tortillas, particularly flour tortillas, in a conical configuration. Upon deep oil cooking of a tortilla in the conical configuration, a conical interior space or void is advantageously formed within which food items such as seasoned ground beef, shredded cheese, shredded lettuce, and diced tomatoes may be served.

First structural components of the instant inventive tortilla fryer comprise a plurality of nesting cone pairs. Each cone among the cone pairs is preferably composed of thin stainless steel sheet metal, and each cone pair preferably comprises an inner cone and an outer cone, all cones having substantially equal opening angles. The interior of each of the inner and outer cones is preferably opened by a multiplicity of oil passages in the form of slots, circular apertures, or rectangular apertures.

A further structural component of the instant inventive tortilla fryer comprises a frame which supports and arranges the cone pairs so that each of their major openings faces substantially horizontally, the long axes of each cone also being substantially horizontal.

Further structural components of the instant inventive tortilla fryer comprise inner cone biasing means. In a preferred embodiment, such biasing means operatively interconnect the support frame with each of the cone pairs' inner cones. The biasing means elements of the invention are preferably adapted to flexibly urge each inner cone in a horizontal direction toward and into the hollow interior of said each cone's corresponding outer cone.

In a preferred embodiment, the biasing means comprise a plurality of tie and spring combinations wherein the springs attach to and engage the inner cones, and wherein the ties have their opposite ends anchored upon the frame. The springs components of such biasing means combinations suitably comprise leaf springs, and the ties preferably comprise chains. Suitably helical springs and other forms of flexible ties may be alternatively utilized.

In use of the instant inventive tortilla fryer, an operator may conically shape and configure tortillas for insertions into the fryer's outer cone openings. Thereafter, the operator may insert one of the fryer's inner cones into the conical hollow opening formed within each of the inserted tortillas. Thereafter, the operator may engage the fryer's biasing means in order to flexibly anchor the assembly's inner cones within the conical interiors of the tortillas. Thereafter, the operator may lower the entire tortilla fryer with its loaded tortillas into the heated oil volume of an upwardly opening fry cooking vat. Heated oil cooking of the conically configured and supported tortillas may then progress.

Upon completion of cooking, the inventive fryer may be raised out of the vat, and the fryer's biasing means may be released. Thereafter, the inner cones and the deep oil fried conical tortillas may be successively withdrawn horizontally from the fryer.

Accordingly, objects of the instant invention include the provision of a tortilla fryer assembly or tool which incorporates structures, as described above, and which arranges those structures in relation to each other in manners described above for the achievement of beneficial functions, as described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 1:
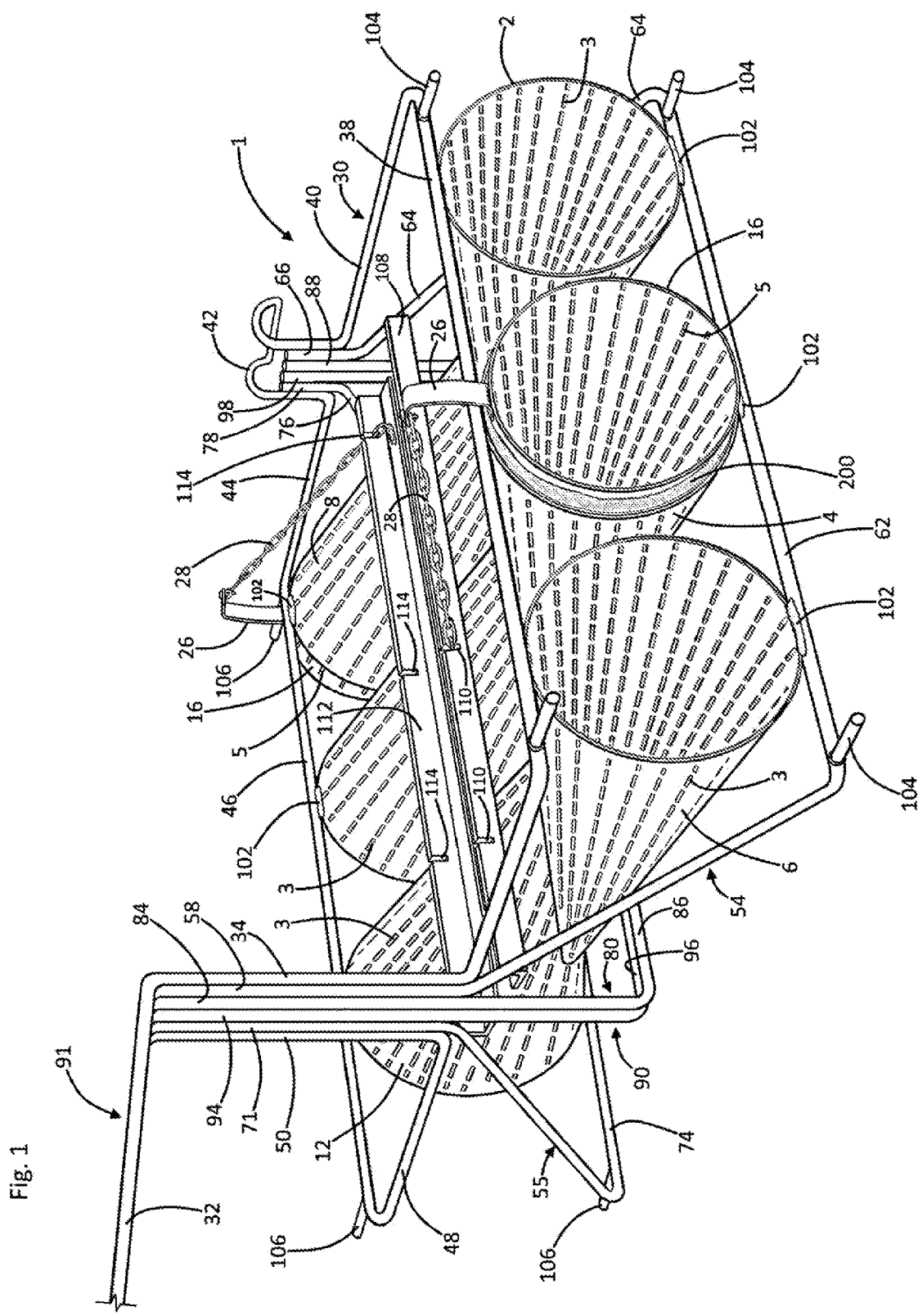
FIG. 1 is a perspective view of a preferred embodiment of the instant inventive tortilla fryer.
Figure 2:
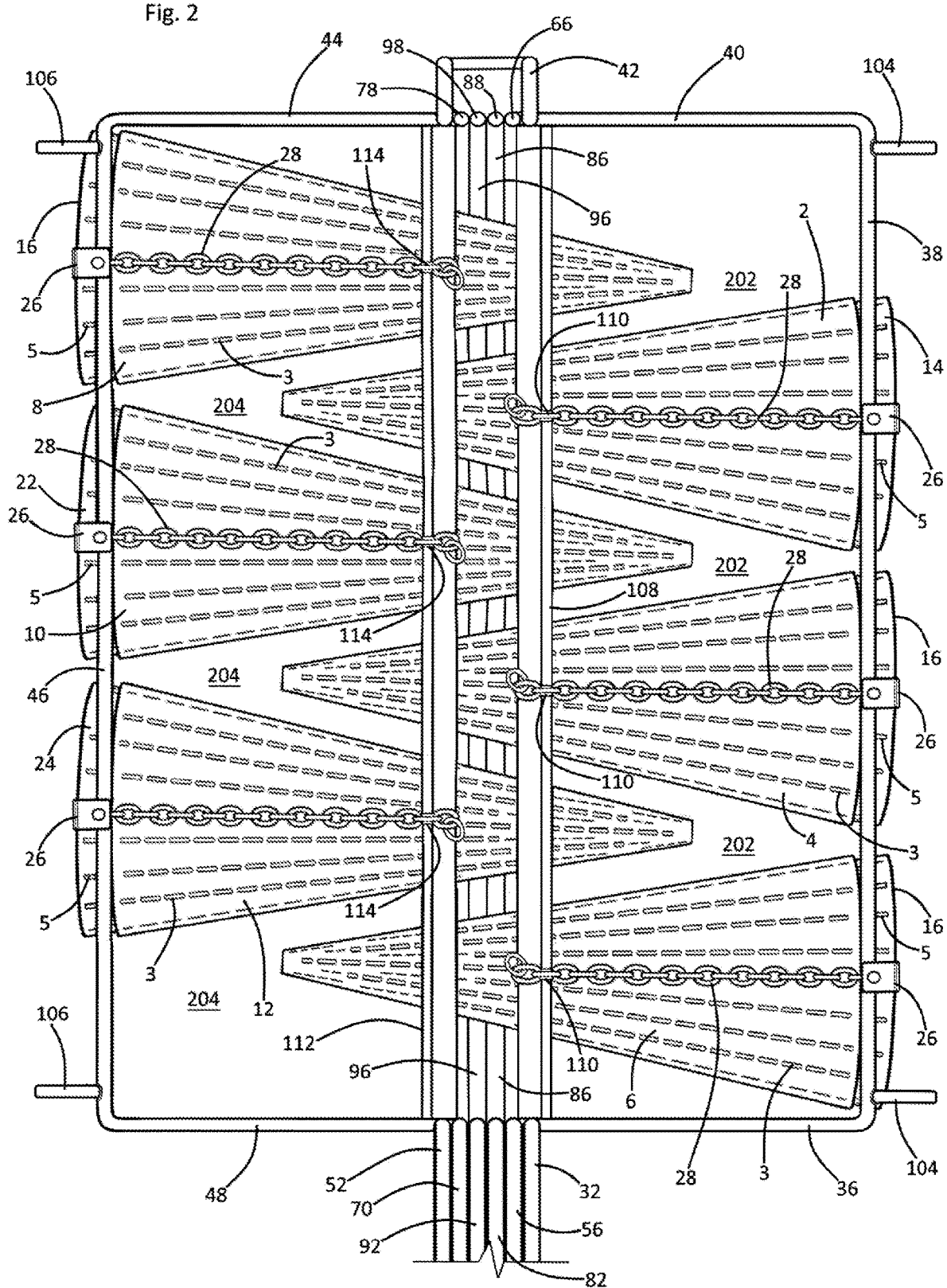
FIG. 2 is an upper plan view of the tortilla fryer of FIG. 1.

Referring now to the drawings, a preferred embodiment of the instant inventive tortilla fryer is referred to generally by Reference Arrow 1. The tortilla fryer 1 comprises a plurality of nesting tortilla molding structures represented by six cone pairs, 2 and 14, 4 and 16, 6 and 18, 8 and 20, 10 and 22, 12 and 24. Each cone pair comprises an inner cone (e.g., cones 14, 16, 18, 20, 22, 24) and comprises an outer cone (e.g., cones 2, 4, 6, 8, 10, or 12), each outer cone nestingly receiving one of the inner cones. Each of the cones is suitably composed of thin stainless steel sheet metal, the cones having multiplicities of cooking oil passages or apertures 3 and 5 through their side walls. The depicted slot configured oil passages 3 and 5 are intended as being representative of various other oil passage configurations, including circular, oval, and rectangular oil passages. Each of the inner and outer cones is necessarily conically configured, and the opening angle of each cone is preferably substantially equivalent to that of each of the other cones.

A further structural component of the instant inventive tortilla fryer comprises a support frame which is suitably composed of stainless steel bar stock. A square or rectangular upper frame component or segment 30 may suitably be composed of a single length of stainless steel bar stock having multiple bends, such single bar including rearwardly extending handle sections 32 and 52, downwardly extending handle sections 34 and 50, rightwardly and leftwardly extending rear sections 36 and 48, forwardly extending sections 38 and 46, rightwardly and leftwardly extending front sections 44 and 40, and a central hook configured section 42. The upper ends of the major openings of the outer cones are preferably securely attached to such bar's forwardly extending sections 38 and 46 by welds 102.

The assembly's frame component preferably further comprises lower right and lower left bar stock frame members 54 and 55. The lower right frame member 54 is suitably composed of a single length of stainless steel bar stock having a rearwardly extending handle section 56, a downwardly extending handle section 58, a downwardly and rightwardly extending rear section 60, a forwardly extending section 62, a leftwardly and upwardly extending front section 64, and a final upwardly extending hook support section 66. In a mirroring fashion, the lower left portion 55 of the frame suitably comprises a single length of steel bar stock having a rearwardly extending handle section 70, a downwardly extending handle section 71, downwardly and leftwardly extending rear section 72, a forwardly extending section 74, a rightwardly and upwardly extending front section 76, and an upwardly extending hook support section 78. The lower ends of the major openings of the outer cones 2, 4, 6, 8, 10, and 12, are preferably fixedly attached to and secured upon the forwardly extending bar sections 62 and 74 by welds 102.

In order to support the relatively pointed and centrally extending ends of the outer cones, at least a first, and preferably an adjacent pair of middle support bars 80 and 90 are suitably provided. Bar 80 suitably comprises a rearwardly extending handle section 82, a downwardly extending handle section 84, a forwardly extending section 86, and an upwardly extending hook support section 88. Bar 90 in a mirroring fashion includes a rearwardly extending handle section 92, a downwardly extending handle section 94, a forwardly extending section 96, and an upwardly extending hook support section 98. The forwardly extending sections 86 and 89 of bars 80 and 90 may suitably be welded together to function as a single forwardly or longitudinally extending bar. The relatively pointed ends of the outer cones 2, 4, 6, 8, 10, and 12 are preferably attached by welds to and supported by such forwardly extending bars 86 and 96.

As indicated above, each of the outer cones is fixedly attached to the bar stock frame by at least three welds, such attachments compactly arranging the cones so that they form a right plurality of "V" spaces 202, and a left plurality of "V" spaces 204. Each of the rearwardly extending bar stock frame members 32, 52, 56, 70, 82, and 92 may be joined by welding in parallel contact with each other to conveniently form and function as a handle which is referred to generally by Reference Arrow 91.

Further structural components of the instant inventive tortilla fryer comprise biasing means which are connected operatively to the frame, such means being adapted for substantially horizontally urging and biasing the inner cones 14, 16, 18, 20, 22, and 24 toward and into the hollow open spaces of their corresponding outer cones 2, 4, 6, 8, 10, and 12. During heated oil cooking of a conically configured tortilla 200, which is situated within the conical annulus between inner cone 16 and outer cone 4, the tortilla 200 often tends to horizontally expel the inner cone 16 from the tortilla's hollow interior. Volumetric expansion of the tortilla, especially a flour tortilla, during cooking tends to drive the expanding surfaces of the tortilla radially outwardly against the inner surface of the outer cone 4 and radially inwardly against the outer surface of the inner cone 16. Such forces are known to combine to axially or rightwardly push both the tortilla 200 and the inner cone 16 out of the outer cone 4. Such expansion induced expulsion of the tortilla 200 from cone 4 during cooking may undesirably result in a collapse of the tortilla during cooking.

In order to resist such undesirable cone expulsions, leaf spring biasing means components 26 may be provided, the lower ends of such springs 26 being fixedly welded or riveted to the upper ends of the inner cones. The upper or distal end of each spring arm 26 is preferably anchored by a tie, each of which preferably comprises a chain 28.

Further biasing means components preferably comprise right and left anchor bars 108 and 112. Such bars preferably comprise angle bars or irons which present upwardly extending flanges which may include right and left series of chain engaging slots 110 and 114. The chains components 28 of the fryer's biasing means may be selectively engaged within the chain anchoring slots 110 and 114, in order to modify tension applied to the leaf springs 26. Upon correctly tensioning the leaf springs 26 through engagements of selected chain links within slots 110 or 114, expansions of the tortillas during cooking are allowed to slightly horizontally expel their inner cone without any excessive horizontal inner cone displacements. By allowing slight horizontally outward motions of the inner cones, the leaf springs 26 advantageously avoid any rigid locking of the inner cones within their outer cones which may otherwise undesirably cause the radial expansions of the tortillas to obtrude outwardly and inwardly into the oil passage slots 3 and 5. Accordingly, the spring leaf biasing means 26 advantageously perform a protective function which prevents seizure and sticking of the cooked tortillas within the oil passages 3 and 5 and upon the inner and outer surfaces of the outer and inner cones. The leaf or arm configured springs 26 are intended as being representative of other flexible springs which may be suitably alternatively provided such as helical springs (not depicted within views).

In use of the instant inventive tortilla fryer 1, an operator may initially disengage each of the chains 28 from its anchor bar slot, 110 or 114. Thereafter, the operator may extract and remove inner cones 14, 16, 18, 20, 22, and 24 from the interior spaces of their corresponding outer cones 2, 4, 6, 8, 10, and 12. Thereafter, the operator may grasp the fryer 1 by its handle 91 and may rotate the entire assembly so that its rightward series of outer cones 2, 4, and 6 is vertically oriented with each outer cone's major opening facing upwardly. Upon achieving such orientation, the operator may lower the fryer 1 downwardly onto a flat work surface, such as a countertop. Leftwardly extending feet 106 are preferably welded to the frame in order to allow the fryer to stand with stability in such upturned orientation on the countertop.

Thereafter, the operator may conically configure three corn tortillas, such as corn tortilla 200, and may insert each of them downwardly into the hollow interior of one of the outer cones 2, 4, and 6. Thereafter, inner cones 14, 16, and 18 may be inserted downwardly into the conical hollow interiors of such inserted tortillas. Thereafter, chains 28 extending from leaf springs 26 may be centrally extended and engaged within slots 110 within the vertical flange of the right anchor bar 108. Simultaneously with the engagements of the chains 28 with the slots 110, slight pulling tension may be applied to each leaf spring, the tensioned chains allowing the chain and leaf spring combinations to gently hold and urge the inner cones 14, 16, and 18 into the conical hollow voids formed by the uncooked conical tortillas.

Thereafter, the operator may invert the fryer 1 180°, allowing the fryer to rest in an oppositely upturned orientation upon rightwardly extending feet 104. In such orientation, the left series of outer cones 8, 10, and 12 is oriented vertically upwardly to facilitate tortilla loading. Tortilla and cone insertion steps described above in relation to cones 2 and 14, 4 and 16, and 6 and 18, may then be repeated with respect to the left cone series 8 and 20, 10 and 22, and 12 and 24.

Upon completion of the tortilla loading steps described above, each of the inner and outer cone combinations includes an uncooked tortilla supported within a conical annulus formed between an inner and an outer cone. In such configuration, each tortilla is flexibly held in place by one of the chain and spring leaf combinations.

Thereafter, the lower end of the tortilla fryer assembly (i.e., portions underlying handle 91) may be lowered into a heated oil fry cooking vat for timed cooking of the tortillas. Upon completion of cooking of the tortillas, the fryer may be raised out of the oil within the vat, and hook 42 may be engaged with an edge of the vat, suspending the cones and cooked tortillas above the heated cooking oil. Thereafter, following a short cooling and degreasing period, the fryer 1 may be returned to the countertop, and chains 28 may be disengaged from their slots 110 and 114. Thereafter, inner cones 14,16,18, and 20,22,24 may be rightwardly and leftwardly extracted, allowing the cooked conical tortillas to be successively rightwardly and leftwardly extracted.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. A tortilla fryer comprising:
   (a) a support frame; and
   (b) a plurality of cone pairs, each cone pair among the plurality of cone pairs comprising an inner cone horizontally received within an outer cone; and
   (c) a plurality of flexible ties, wherein each of the cone pairs' outer cones is fixedly attached to the support frame, and wherein each of the cone pairs' inner cones is anchored upon the support frame by one of the flexible ties.

2. A tortilla fryer comprising:
   (a) a support frame; and
   (b) a plurality of cone pairs, each cone pair among the plurality of cone pairs comprising an inner cone horizontally received within an outer cone, said each cone pair being fixedly attached to the support frame; and
   (c) biasing means operatively interconnecting the support frame and said each cone pair's inner cone, the biasing means being adapted for resisting horizontal movement of said inner cone from said each cone pair's outer cone.

3. A tortilla fryer comprising:
   (a) a support frame; and
   (b) a plurality of cone pairs, each cone pair among the plurality of cone pairs comprising an inner cone horizontally received within an outer cone, said each cone pair being fixedly attached to the support frame;
   (c) biasing means operatively interconnecting the support frame and said each cone pair's inner cone, the biasing means being adapted for resisting horizontal movement of said inner cone from said each cone pair's outer cone; and
   (d) inner and outer multiplicities of oil passages, wherein each oil passage among the inner multiplicity of oil passages opens one of cone pairs' inner cones, and wherein each oil passage among the outer multiplicity of oil passages opens one of the cone pairs' outer cones.

4. The tortilla fryer of claim 3 wherein the biasing means comprise a plurality of chains.

5. The tortilla fryer of claim 4 wherein the biasing means further comprise a plurality of spring arms, each spring arm spanning between one of the inner cones and an end of one of the chains.

6. The tortilla fryer of claim 5 wherein the biasing means further comprise at least a first anchor bar, and wherein an opposite end of the one of the chains is releasably attached to the at least first anchor bar.

7. The tortilla fryer of claim 3 wherein the plurality of cone pairs comprise a series of leftwardly opening cone pairs and a series of rightwardly opening cone pairs.

8. The tortilla fryer of claim 7 comprising right and left pluralities of "V" spaces, wherein each space among the right plurality of "V" spaces receives one of the leftwardly opening cone pairs, and wherein each space among the left plurality of "V" spaces receives one of the rightwardly opening cone pairs.

9. The tortilla fryer of claim 8 wherein the leftwardly and rightwardly opening cone pairs respectively have leftward and rightward ends, wherein the frame comprises an at least first right bar and an at least first left bar, wherein the at least first right bar supports the rightward ends of the rightwardly opening cone pairs, and wherein the at least first left bar supports the leftward ends of the leftwardly opening cone pairs.

10. The tortilla fryer of claim 9 wherein the frame further comprises at least a first middle bar, said bar further supporting at least one of the series among the series of leftwardly opening cone pairs and the series of rightwardly opening cone pairs.

11. The tortilla fryer of claim 10 further comprising a handle fixedly attached to a rearward end of the frame.

12. The tortilla fryer of claim 10 further comprising a suspension hook fixedly attached to a forward end of the frame.

13. The tortilla fryer of claim 10 further comprising a left plurality of feet and a right plurality of feet, each foot among the left plurality of feet being fixedly attached to and extending leftwardly from the frame, and each foot among the right plurality of feet being fixedly attached to and extending rightwardly from the frame.

* * * * *